J. A. SCHWOB.
CIDER-MILL.

No. 184,548. Patented Nov. 21, 1876.

WITNESSES:
E. F. Wolff
John Goethals

INVENTOR:
J. A. Schwob
BY
Munn & Co.
ATTORNEYS.

UNITED STATES PATENT OFFICE.

JOHN A. SCHWOB, OF MILTONSBURG, OHIO.

IMPROVEMENT IN CIDER-MILLS.

Specification forming part of Letters Patent No. 184,548, dated November 21, 1876; application filed September 2, 1876.

*To all whom it may concern:*

Figure 1:
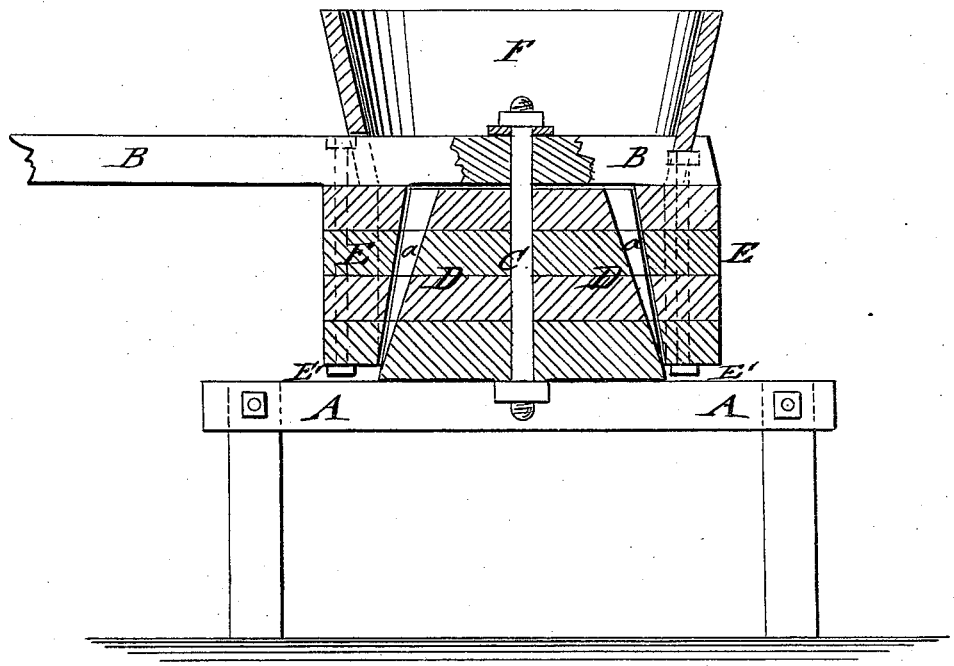
Figure 2:
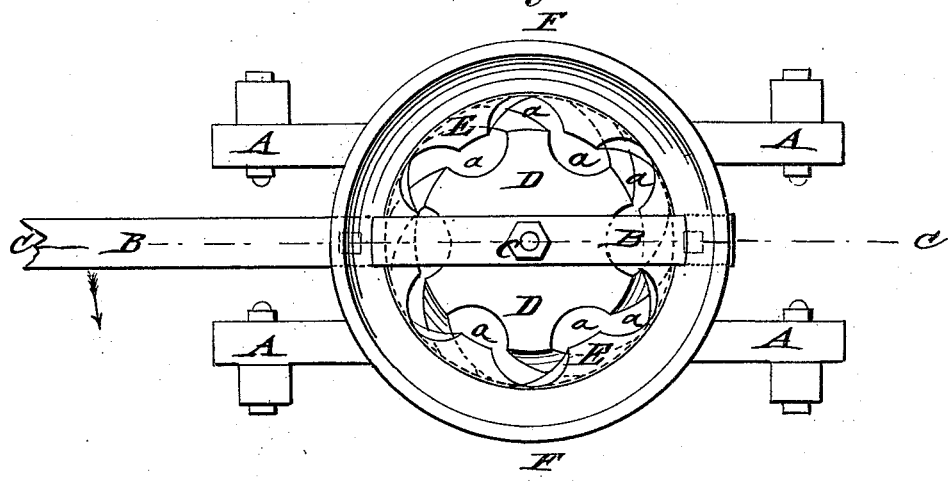

Be it known that I, JOHN A. SCHWOB, of Miltonsburg, county of Monroe and State of Ohio, have invented a new and Improved Cider-Mill, of which the following is a specification:

In the accompanying drawing, Figure 1 represents a vertical central section of my improved cider-mill on line $cc$, Fig. 2; and Fig. 2 is a top view of the same.

Similar letters of reference indicate corresponding parts.

The invention relates to an improved cider-mill, which is constructed of wooden sections, so as to be readily set up, moved to any place, and stored away after use. The invention consists of an interior stationary masher of conical or tapering form, provided with spiral recesses, and of an outer revolving grinder extending around the masher and having recesses running in opposite direction, both masher and grinder being made of plank, arranged at cross-grains and bolted together, as hereinafter described.

In the drawing, A A are the mill-supporting pieces, that are readily set upon posts driven in the ground at such height that a tub to take up the mashed apples may be readily placed below the supporting-pieces. The inner masher D and the outer grinder E are made of planks of suitable thickness laid at cross-grains and bolted together, the masher being connected by a strong central bolt, C, and the grades by outer bolts E'. The masher and grinder may be cut from one solid block, formed as described, the masher being made of conical shape, and the grinder of cylindrical outer shape, but fitting and encircling the masher. The masher is secured stationary to the pieces A, while the grinder E is revolved by a lever, B, worked either by hand or horse power, the lever being bolted to the grinder and swinging around the center-bolt C of the masher as a pivot. The masher and grinder are both cut with spirally-curved grooves $a$ that run in opposite directions, as shown in Fig. 1, so as to take up the apples and grind them thoroughly. By raising or lowering the grinder on the stationary masher the mill may be readily adjusted to grind hard or mellow apples. A hopper, F, is secured to the top of the grinder, and revolved with the same, so as to feed the apples continually during the working of the mill. The mill is readily put up for use, and taken down for being stored, and produces, by its simple, cheap, and effective construction, the quick grinding up of the apples without coloring the cider.

Having thus described my invention, I claim as new and desire to secure by Letters Patent—

1. A grinding-mill, having its corresponding part D E made in horizontal sections, adapted to be bolted together, as described.

2. The sections D E of a grinding-mill, made of wood, and arranged at cross-grains alternately, as and for the purpose set forth.

3. The grinder E, rotated by a lever, B, pivoted on a bolt, C, that holds together the sections of masher D, as shown and described.

JOHN A. SCHWOB.

Witnesses:
ALEX. HARDESTY,
JOHN W. ROUSE.